(No Model.)
L. E. DUBOIS.
SAFETY ATTACHMENT FOR STREET CARS.
No. 499,910. Patented June 20, 1893.
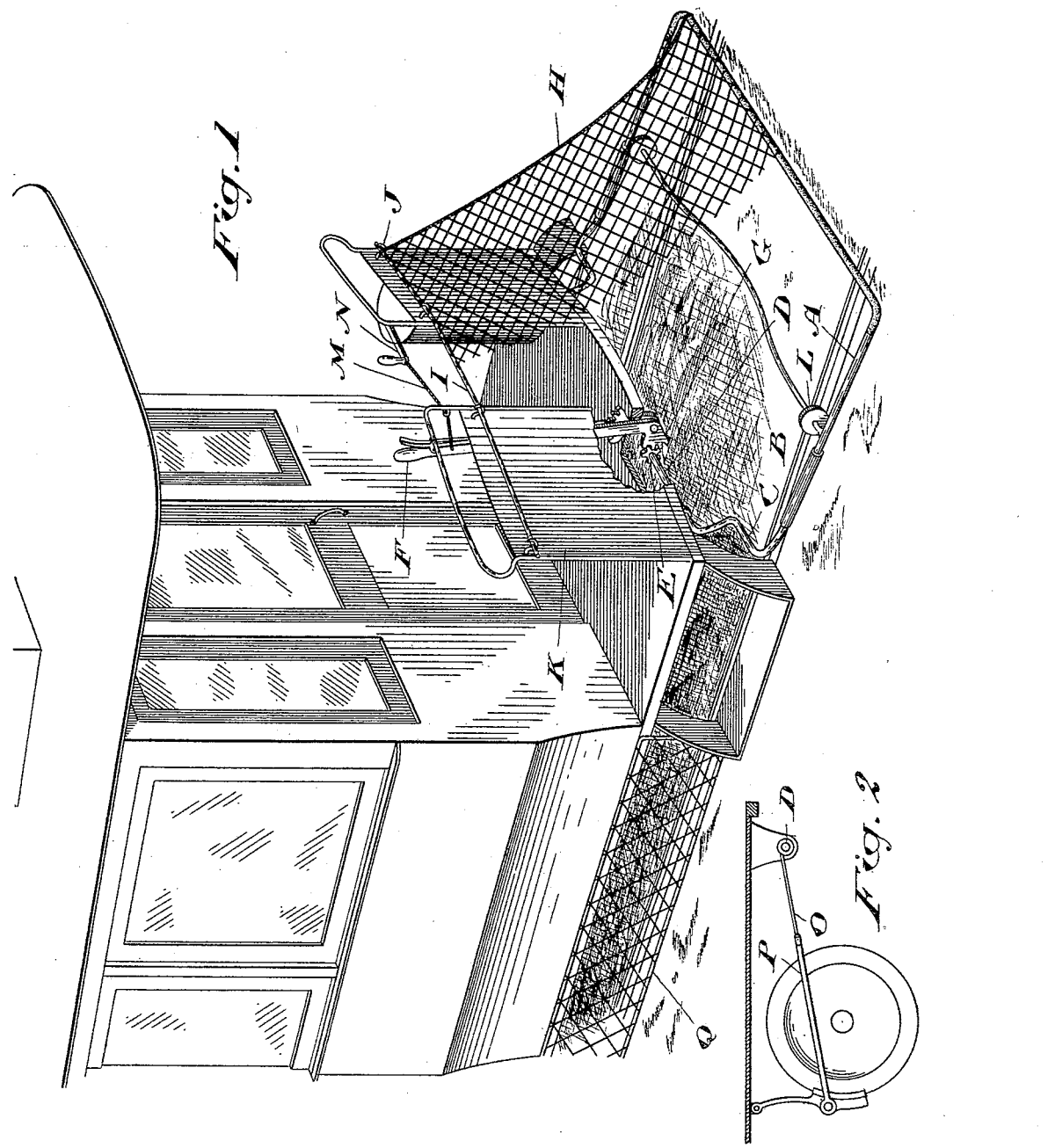
Witnesses
J. Edw. Maybee
John E. Cameron
Inventor
Louis E. Dubois
by Donald C. Ridout & Co
Attys.

UNITED STATES PATENT OFFICE.

LOUIS E. DUBOIS, OF TORONTO, CANADA.

SAFETY ATTACHMENT FOR STREET-CARS.

SPECIFICATION forming part of Letters Patent No. 499,910, dated June 20, 1893.

Application filed September 19, 1892. Serial No. 446,286. (No model.)

*To all whom it may concern:*

Be it known that I, LOUIS E. DUBOIS, of the city of Toronto, in the county of York, in the Province of Ontario, Canada, have invented a certain new and Improved Safety Attachment for Street-Cars, of which the following is a specification.

The object of the invention is to provide means by which a car will be prevented from running over a human being or any other obstacle which might get upon the track in front of a running car, and it consists, essentially, of a netting carried in a light frame detachably connected to the front of a car and provided with mechanism by which it may be instantly thrown close to the ground, the lever by which the catcher is thrown down being arranged to simultaneously cut off the current and apply the brake; substantially as hereinafter more particularly explained and then definitely claimed.

Figure 1, is a perspective view of an end of a car provided with my improved attachment. Fig. 2, is a detail, showing how the brake is applied.

In the drawings, A, is a light frame, the front bar of which being preferably made of rubber or some other suitable material. The ends of this frame A, fit into the sockets B, which are attached to the cranks C, formed on the ends of the cross-bar D. This bar D, is suitably journaled on the bottom of the car and has a pinion E, fixed to it.

F, is a hand lever pivoted on the bottom of the car and having a rack G, formed on its end to engage with the pinion E, as indicated.

The net H, is connected at one end to the frame A, and at the other end to a bar I, which bar fits into the hooks J, attached to the splash board K.

A pair of rollers L, are suitably connected to the frame A, and arranged to roll upon the track when the catcher is thrown down in the position indicated in Fig. 1.

When the catcher is not required for use, the lever F, is pushed forward and by its forward movement, the rack G, revolves the pinion E, and the cranks C, raise the front frame A, into a vertical position, in which position the catcher is usually carried.

M, is a cord connecting the lever F, to the lever N, by the movement of which lever a current is thrown on or off the motor. When the lever F, is in the former position, the cord M, is sufficiently loose to allow of the necessary movement of the lever N. Should an obstruction fall on the track, the driver draws the lever F, back, which movement rocks the cross-bar D, so as to drop the frame A, leaving the net in such a position that it will gather up anything in front of it.

In Fig. 2, I show how the rocking of the bar D, applies a brake at the same time that it lowers the net or catcher.

O, is a cord or chain connected at one end to the crank or cross-bar D, and at the other end to the brake rod P.

When the catcher is thrown down by the rocking or revolving of the rod D, the rope or chain O, is wound upon the said rod thereby shortening the rope and applying the brakes. The movement of the lever F, by which the bar D is rocked simultaneously draws upon the cord M, which acting against the lever N, shuts off the current. In this way it will be observed that the movement of the single lever F, throws the catcher down to the ground and simultaneously applies the brake and cuts off the current. As the frame A, which carries the net is detachably connected to the crank C, the said net can be readily removed it being merely necessary to draw the frame A, out of the sockets, B and raise the bar I, clear of the hooks J. In this way it is easy to change the catcher from one end to the other.

On each side and at each end of the car I place a light frame Q, carrying a light netting of about four inch mesh. This netting will effectually prevent any one passing below the wheels and in the event of any one coming in contact with it, it can be easily gripped, the mesh of the netting being sufficiently coarse to allow of it being grasped easily.

What I claim as my invention is—

1. A frame A journaled on the end of a car and having a net H attached thereto, and a pinion E fixed to said frame, in combination with a lever F pivoted on the car and having a rack on its end engaging with said pinion for operating the frame, substantially as described.

2. A net carried on a frame detachably connected to a crank bar journaled on the end of a car and a cord or chain connecting the crank bar to the brake rod and a cord or chain connecting the hand lever to the lever by which the motor is stopped, in combination with a hand lever pivoted on the end of a car and arranged so that by a single stroke of the lever the net may be thrown down in front of the car; substantially as and for the purpose specified.

3. A frame having a net attached thereto and journaled on the end of a car, and a lever F pivoted on said car and arranged to rock said frame, in combination with a lever N and brake connection O P D, having connections with said lever F and arranged to be operated thereby, substantially as described.

4. A frame A detachably connected to the end of a car and having a net H thereon in combination with a rod I detachably connected to said car and supporting said net, substantially as described.

Toronto, September 12, 1892.

. LOUIS E. DUBOIS.

In presence of—
A. M. NEFF,
J. EDW. MAYBEE.